United States Patent [19]

Concannon et al.

[11] 4,252,859
[45] Feb. 24, 1981

[54] FLUOROPOLYMER BLEND COATING COMPOSITIONS CONTAINING COPOLYMERS OF PERFLUORINATED POLYVINYL ETHER

[75] Inventors: Thomas P. Concannon, Newtown Square; Eva M. Vary, Wynnewood, both of Pa.

[73] Assignee: E. I. Du Pont de Nemours and Company, Wilmington, Del.

[21] Appl. No.: 956,349

[22] Filed: Oct. 31, 1978

[51] Int. Cl.$^3$ .................. B32B 27/00; B05D 3/02
[52] U.S. Cl. .................. 428/422; 260/29.6 F; 427/385.3; 427/388.4; 427/388.5; 427/407.1; 427/409; 427/421; 525/200
[58] Field of Search .................. 260/900, 29.6 F; 428/422; 427/385 R, 388 R, 388 C, 388.4, 388.5, 385.5, 407.1, 409, 421; 525/200, 199; 526/247

[56] References Cited

U.S. PATENT DOCUMENTS

| | | | |
|---|---|---|---|
| 3,132,123 | 5/1964 | Harris, Jr. et al. | 526/236 X |
| 3,484,503 | 12/1969 | Magner et al. | 260/900 |
| 3,851,018 | 11/1974 | Kelley | 260/900 |
| 3,925,292 | 12/1975 | Holmes | |
| 1,329,049 | 9/1973 | United Kingdom | |
| 3,946,136 | 3/1976 | Fitz et al. | 428/422 |
| 3,987,126 | 10/1976 | Brodoway | 260/900 X |
| 4,122,226 | 10/1978 | Vassiliou | 260/900 X |
| 4,123,401 | 10/1978 | Berghmans et al. | 260/29.6 F |
| 4,128,693 | 12/1978 | Dhami et al. | 428/379 |

*Primary Examiner*—Ronald H. Smith
*Assistant Examiner*—Thurman K. Page

[57] ABSTRACT

Blends of PTFE and perfluorinated ether copolymers of TFE and perfluoro(propyl vinyl ether) provide coating compositions which have reduced crystallinity and useful lives superior to what would be expected from averaging the properties of the unblended resins themselves.

19 Claims, No Drawings

FLUOROPOLYMER BLEND COATING COMPOSITIONS CONTAINING COPOLYMERS OF PERFLUORINATED POLYVINYL ETHER

BACKGROUND OF THE INVENTION

The present invention relates to coating compositions based on fluorocarbon polymers. Such compositions can be used as nonstick coatings on cookware.

The cookware coating industry continues to try to improve coating compositions so that the ultimate user can have a product of superior characteristics which will last as long as possible. The same applies for nonstick coating compositions for other applications.

There are many patents relating to the use of polytetrafluoroethylene (PTFE) in cookware coating compositions. Representative of some of the more recent is U.S. Pat. No. 4,123,401—Berghmans et al. (1978).

Fluorinated vinyl ether copolymers, especially copolymerized with tetrafluoroethylene (TFE), have been available for some years. Representative patents include U.S. Pat. No. 3,132,123—Harris et al. (1964), U.S. Pat. No. 3,855,191—Doughty et al. (1974), U.S. Pat. No. 4,029,868— Carlson (1977) directed to a terpolymer, U.S. Pat. No. 4,078,134—Kuhls et al. (1978), and U.S. Pat. No. 4,078,135—Sulzbach et al. (1978). These patents are incorporated by reference herein. The fluorinated vinyl ethers, such as in the form of copolymers, terpolymers or quadripolymers, with or without cyclic units, are generally more expensive than PTFE. Thus, they have not been considered to be a practical substitute for PTFE in nonstick coatings.

SUMMARY OF THE INVENTION

The present invention provides coating compositions comprising, by weight, 1–99% of a particulate polymer of monoethylenically unsaturated hydrocarbon monomers completely substituted with fluorine atoms or a combination of fluorine atoms and chlorine atoms, the polymer having a number average molecular weight of at least 20,000 and 99–1% of a copolymer of (i) tetrafluoroethylene, (ii) at least one of a perfluorinated vinyl ether having the formula $CF_2=CF-O-R_f$ in which $R_f$ represents one or more perfluoroalkyl radicals having from 1 to 10 carbon atoms or a perfluorinated ether having the formula:

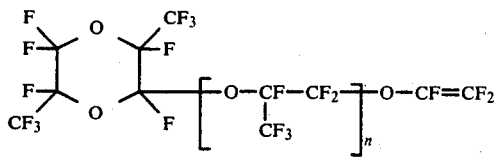

in which n is zero to 4, and, optionally, (iii) hexafluoropropylene, (iv) vinylidene fluoride, or both (Percentages and proportions herein are by weight except where indicated otherwise.)

Preferably, the coating compositions comprise PTFE and a copolymer containing 99.5–92%, more preferably 99–96%, tetrafluoroethylene and 0.5–8%, more preferably 1–4%, perfluoro(propyl vinyl ether).

Coated articles and processes of producing coated articles are also encompassed by the invention. The coating compositions are applied and cured to coalesce the coatings at temperatures preferably of at least about 315° C., such as 420° C., to produce a composite structure having reduced crystallinity compared to that which would be predicted by averaging the crystallinity of the PTFE and the ether.

DETAILED DESCRIPTION OF THE INVENTION

Empirical and scientific tests have been performed to illustrate the advantages of the invention. These tests utilized blends of PTFE and perfluorinated vinyl ether copolymers of TFE and poly(propyl vinyl ether) (PPVE). These copolymers are referred hereinafter as PFA. Proportions of PPVE and TFE in the copolymer were varied, as were proportions of PTFE and PFA in the blend.

The useful lives of coatings made according to the invention were compared to coatings outside the invention by means of abuse cooking tests. In these tests, food was cooked at a controlled temperature in pans having different coatings on the right side and the left side of the pan. A testing device simulating a metal fork was stirred at constant pressure around both sides of the pan during cooking. The life of a pan was determined by its resistance to scratches in the coating, especially those that penetrate through the coating. The cooking temperature of the pans was maintained at 205° C. ±28° C.

The comparisons were made between coatings containing PTFE which represented the prior art and coatings of the invention containing blends of PTFE and PFA. The coatings were prepared and applied by techniques known in the art and generally according to the teachings of U.S. Pat. Nos. 4,123,401 and 4,122,226, among others.

Most tests were made with three-layer coatings. A primer coat was sprayed onto bare metal which had been grit-blasted. Then the intermediate coating was sprayed on the primer. Then the topcoat was sprayed onto the intermediate coat. Although it is not necessary to dry or cure each coat before applying the next, it is sometimes preferable to permit some drying between coats. Enough primer is applied to give a coating preferably about 5–15 μm thick. The overall film build for all three coatings together is preferably about 12.5–87.5 μm, more preferably 30–37.5 μm. The thickness ratio of the intermediate coat to the topcoat is preferably from 25:75 to 75:25, more preferably about 50:50.

After all three coatings have been applied, the coated substrate is baked to cure the coating, preferably at temperatures in the range of 340°–470° C., more preferably 385°–440° C., most preferably about 420° C., for times up to one hour, preferably about 10 minutes, long enough depending on the temperature, to cure the coating by causing coalescence.

While a variety of combinations of PTFE and PFA were tried in each layer of the coating, typical coatings consist of:

| Ingredient | % Solids | % of Composition |
|---|---|---|
| Primer | | |
| PTFE dispersion | 60 | } 34.69 |
| PFA dispersion | 61.9 | |
| Furfuryl alcohol | — | 1.22 |
| Water | — | 27.40 |
| A-10 amide-imide polymer solution | 30 | 12.18 |
| Cobalt blue pigment dispersion | 45 | 10.43 |
| Silica sol | 30 | 14.01 |

| Ingredient | % Solids | % of Composition |
|---|---|---|
| TiO$_2$-coated mica flake | 100 | 0.07 |
| Intermediate | | |
| PTFE dispersion | 60 | } 67.32 |
| PFA dispersion | 61.9 | |
| Water | — | 6.06 |
| Channel black | 45 | 0.26 |
| Cobalt blue pigment dispersion | 45 | 0.26 |
| Ti-coated mica flake | 100 | 0.89 |
| Ce-octoate solution in 2-ethyl-hexanoic acid | 12 | 12.68 |
| Acrylic dispersion | 40 | 12.53 |
| Topcoat | | |
| PTFE dispersion | 60 | } 70.08 |
| PFA dispersion | 61.9 | |
| Water | — | 3.98 |
| Ti-coated mica flake | 100 | 0.43 |
| Ce-octoate solution in 2-ethyl-hexanoic acid | 12 | 12.49 |
| Acrylic dispersion | 40 | 13.02 |

More details of the ingredients used are presented in U.S. Pat. Nos. 4,123,401 and 4,122,226, both incorporated herein by reference, and especially in the examples of U.S. Pat. No. 4,123,401.

It has been found that if the PFA content is less than 10% of the fluorocarbon content of the blend, improvements relative to PTFE in terms of life of a coating in abuse cooking tests are relatively minor, approximately 50–100%. When the PFA content is increased to between 15 and 30% of the total fluorocarbon content, two- to three-fold increases in abuse cooking life have been obtained. Coatings which are pure PFA do not perform better than those which contain only 15–30% PFA, although they would be considerably more expensive.

Additional abuse cooking tests have shown that the level of PPVE monomer in PFA is also important. A PFA copolymer with less than 0.5% PPVE does not provide the improvements observed in PFA copolymers with 2–8% PPVE. Indded, copolymers with 0.2–0.3% PPVE behave no differently than pure PTFE. PPVE contents about 8% are generally uneconomical. Improvements in properties, if any, with more than 8% PPVE are generally not worth the increased cost of the copolymer.

An analysis of the results of these empirical tests indicates that the PTFE-PFA blends give a tougher more scratch-resistant, less permeable coating which is also more elastic and less brittle than PTFE coatings. These factors lead to longer useful lives of cookware bearing coatings of the invention.

Further tests including differential scanning calorimetry and elasticity and recovery tests show that blends of PTFE and PFA, especially with about 25% PFA, behave as composite materials with considerably less crystallinity than would be predicted by averaging the crystallinity of the PTFE and the ether. Evidently, the small proportion of PFA somewhat interacts with the PTFE particles to decrease the crystallinity of the PTFE. It is unnecessary to hypothesize any specific mechanism for this phenomenon. The end result is superior performance, beyond that which would be expected.

PTFE is known to have a high degree of crystallinity. There are various methods that can be used to determine the amount of crystallinity in polymers, including x-ray diffraction, nuclear magnetic resonance, infrared spectroscopy and measuring the melt-transition endotherm such as by differential scanning calorimetry. Because of its availability and versatility, the latter technique was used to study the effects of PFA contents in PTFE-PFA blends.

The endotherm varied depending on whether they were taken for a first melting of previously unsintered polymers or for second melting. The magnitude of the endotherm, referred to as ΔH, while not a direct measurement of crystallinity, is generally proportional to the amount of crystallinity in these tests. The data presented in the table below indicates a decrease in crystallinity for PTFE-PFA blends greater than would be predicted by or calculated from straight line extrapolation between the values for PTFE and those for PFA.

| Melt Transition Δ H of PTFE-PFA Blends | | | | | |
|---|---|---|---|---|---|
| | % PFA Blended with PTFE | | | | |
| | 0 | 10 | 25 | 50 | 100 |
| First Melt | | | | | |
| End point - experimental | 17.5 | | | | 8.6 |
| Blend calculated | | 16.6 | 15.3 | 13.1 | |
| Blend experimental | | 15.8 | 14.0 | 12.7 | |
| Second Melt | | | | | |
| End point - experimental | 7.2 | | | | 4.5 |
| Blend calculated | | 6.9 | 6.6 | 5.9 | |
| Blend experimental | | 7.3 | 5.6 | 6.3 | |

Also, it has been found that the modulus of elasticity of PTFE-PFA blends with 25 and 50% PFA is greater than that of either PTFE or PFA itself.

These data and the empirical test results discussed above suggest that the claimed compositions are not mere blends but involve interaction between the PTFE and the PFA, or their equivalents, acting as composite materials with properties superior to what would be expected. The decrease in crystallinity and the increase in modulus of elasticity evidently contribute to making a coating which is more elastic and durable and less brittle. Such coatings tend to spring back when deformed and suffer less damage under the same conditions of test or use than do prior art PTFE coatings.

What is claimed is:

1. A coating composition comprising, by weight,
   (A) 50–95% of a particulate polymer of monoethylenically unsaturated hydrocarbon monomers completely substituted with fluorine atoms or a combination of fluorine atoms and chlorine atoms, the polymer having a number average molecular weight of at least 20,000; and
   (B) 10–50% of a perfluorinated copolymer containing (i) 99.5–92% tetrafluoroethylene, (ii) 0.5–8% at least one vinyl ether having the formula:

$$CF_2=CF-O-R_f$$ 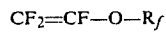

in which $R_f$ represents one or more perfluoroalkyl radicals having from 1 to 10 carbon atoms or a perfluorinated ether having the formula:

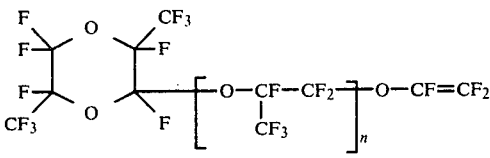

in which n is zero to 4, and optionally, (iii) hexafluoropropylene.

2. The coating composition of claim 1 which also contains a liquid carrier.

3. The coating composition of claim 2 wherein (A) and (B) are present as an aqueous dispersion.

4. The coating composition of claim 1 without liquid carriers wherein (A) and (B) are in particulate fporm.

5. The coating composition of claim 1 wherein (B) is one or more copolymers of perfluoroalkyl perfluorovinyl ethers with tetrafluoroethylene, said ether having the formula

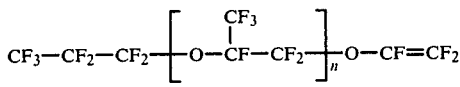

in which n is 1 to 4.

6. The coating composition of claim 1 wherein (B) is a terpolymer consisting of, in copolymerized form,
  (a) tetrafluoroethylene,
  (b) between about 1 and about 12 weight percent hexafluoropropylene, and
  (c) between about 0.5 and about 6 weight percent of either perfluoro(ethyl vinyl ether) or perfluoro(n-propyl vinyl ether).

7. The coating composition of claim 5 wherein (A) is polytetrafluoroethylene.

8. The coating composition of claim 7 wherein (B) is a copolymer consisting of, in copolymerized form, polytetrafluoroethylene and perfluoro(propyl vinyl ether).

9. The coating composition of claim 1 wherein (B) is present in an amount of 10–30% by weight based on the total of (A) plus (B).

10. The coating composition of claim 1 wherein (B) is a copolymer consisting of, in copolymerized form, 99.5–92% tetrafluoroethylene and 0.5–8% perfluoro(propyl vinyl ether).

11. The coating composition of claim 10 wherein (B) is a copolymer consisting of, in copolymerized form, 99–96% tetrafluoroethylene and –4% perfluoro(propyl vinyl ether).

12. A coated article comprising a substrate having on it a cured coating which has been formed by applying a coating composition of claim 10 and heating to a temperature and for a time sufficient to cure said coating.

13. A coated article according to claim 12 wherein said cured coating has a crystallinity reduced from that which would be predicted by averaging the crystallinity of (A) and (B).

14. A process of coating a substrate wherein a coating composition of claim 10 is applied to a substrate and cured by heating at temperatures of at least 315° C. for a time sufficient to cure said coating.

15. The process of claim 14 wherein the cured coating has a crystallinity reduced from that which would be predicted by averaging the crystallinity of (A) and (B).

16. The process of claim 14 wherein the heating is done at about 420° C.

17. The coated article of claim 11, 12 or 13 in the form of an article of cookware.

18. The coating composition of claim 5, 6, 7, 8, 9 or 10 which also contains a liquid carrier and wherein (A) and (B) are present as an aqueous dispersion.

19. The process of claim 13, 15 or 16 wherein the coating composition also contains a liquid carrier and wherein (A) and (B) are present as an aqueous dispersion.

* * * * *

UNITED STATES PATENT OFFICE
CERTIFICATE OF CORRECTION

PATENT NO. : 4,252,859
DATED : February 24, 1981
INVENTOR(S) : Thomas P. Concannon and Eva M. Vary It is certified that error appears in the above-identified patent and that said Letters Patent are hereby corrected as shown below:

Column 4, line 53;   "50-95%" should read -- 50-90% --.

Column 6, line 12;   "-4%" should read -- 1-4% --.

Column 6, line 32;   delete "11".

Column 6, line 37;   "claim 13" should read -- claim 14 --.

Signed and Sealed this

Ninth Day of June 1981

[SEAL]

Attest:

RENE D. TEGTMEYER

Attesting Officer          Acting Commissioner of Patents and Trademarks